(12) United States Patent
Muzvidziwa et al.

(10) Patent No.: US 12,305,732 B2
(45) Date of Patent: May 20, 2025

(54) SHOCK ABSORBER

(71) Applicant: Hitachi Astemo, Ltd., Hitachinaka (JP)

(72) Inventors: Milton Muzvidziwa, Hitachinaka (JP); Koichi Yamaka, Hitachinaka (JP); Yohei Katayama, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 372 days.

(21) Appl. No.: 17/791,773

(22) PCT Filed: Jan. 20, 2021

(86) PCT No.: PCT/JP2021/001831
§ 371 (c)(1),
(2) Date: Jul. 8, 2022

(87) PCT Pub. No.: WO2021/149718
PCT Pub. Date: Jul. 29, 2021

(65) Prior Publication Data
US 2023/0037408 A1    Feb. 9, 2023

(30) Foreign Application Priority Data

Jan. 24, 2020    (JP) ................................ 2020-010063

(51) Int. Cl.
    *F16F 9/34*        (2006.01)
    *F16F 9/19*        (2006.01)
    (Continued)

(52) U.S. Cl.
    CPC .............. *F16F 9/3271* (2013.01); *F16F 9/19* (2013.01); *F16F 9/34* (2013.01); *F16F 9/46* (2013.01);
    (Continued)

(58) Field of Classification Search
CPC .......... F16F 9/512; F16F 9/5126; F16F 9/516; F16F 9/34; F16F 9/19; F16F 9/46; F16F 9/464; F16F 9/465; F16F 9/469
(Continued)

(56) References Cited

U.S. PATENT DOCUMENTS 6,332,622 B1 * 12/2001 Nakamura ............... F16F 9/464
                                                    188/266.5
2002/0000352 A1 * 1/2002 Matsumoto ........... F16F 9/3484
                                                    188/282.1

(Continued)

FOREIGN PATENT DOCUMENTS

DE      4118030 A1 * 12/1992 .............. F16F 9/465
JP      2019-173786    10/2019

OTHER PUBLICATIONS

International Search Report issued Feb. 16, 2021 in International Application No. PCT/JP2021/001831, with English translation.
(Continued)

*Primary Examiner* — Thomas J Williams
(74) *Attorney, Agent, or Firm* — Wenderoth, Lind & Ponack, L.L.P.

(57) ABSTRACT

A piston bolt is formed by divided first and second members, and a first small-diameter portion and a large diameter portion of a common passage are formed in the first member and a second small-diameter portion of the common passage is formed in the second member. This configuration allows the common passage to be processed using a general-purpose method and tool and contributes to reducing the man-hours for the piston bolt.

15 Claims, 5 Drawing Sheets

(51) Int. Cl.
*F16F 9/32* (2006.01)
*F16F 9/46* (2006.01)

(52) U.S. Cl.
CPC ..... *F16F 2222/12* (2013.01); *F16F 2228/066* (2013.01); *F16F 2232/08* (2013.01); *F16F 2234/02* (2013.01)

(58) Field of Classification Search
USPC .......... 188/282.1, 282.2, 282.4, 282.5, 282.6
See application file for complete search history.

(56) References Cited

U.S. PATENT DOCUMENTS

| 2003/0029684 | A1* | 2/2003 | Forster | F16F 9/3485 |
| | | | | 188/282.5 |
| 2008/0236966 | A1* | 10/2008 | Yamaguchi | F16F 9/465 |
| | | | | 188/275 |
| 2023/0037408 | A1* | 2/2023 | Muzvidziwa | F16F 9/34 |

OTHER PUBLICATIONS

Written Opinion of the International Searching Authority issued Feb. 16, 2021 in International Application No. PCT/JP2021/001831, with English translation.

\* cited by examiner

SHOCK ABSORBER

TECHNICAL FIELD

The present invention relates to a shock absorber that adjusts a damping force by controlling a flow of oil fluid with respect to a stroke of a piston rod.

BACKGROUND ART

PTL 1 discloses a shock absorber including a common passage formed in a shaft portion of a piston bolt. A flow of oil fluid in the common passage is controlled by a valve spool (a valve body) movable provided in the common passage.

CITATION LIST

Patent Literature

PTL 1: Japanese Patent Application Public Disclosure No. 2019-173786

SUMMARY OF INVENTION

Technical Problem

The above-described common passage is formed by a plurality of axial passages different in inner diameter. Each of the axial passages is processed by inserting a tool (an instrument) from a front side (the head portion of the piston bolt) in one direction, which necessitates a special method and tool to process an axial passage (a large-diameter portion) on the deep side and makes it difficult to ensure the precision. Further, such processing leads to an increase in the man-hours and thus an increase in the manufacturing cost, and serves as a cause for a reduction in the productivity.

One of objects of the present invention is to provide a shock absorber capable of reducing man-hours for a piston bolt.

Solution to Problem

A shock absorber according to one aspect of the present invention is a damping force adjustable shock absorber including a cylinder sealingly containing hydraulic fluid therein, a piston slidably fitted in the cylinder and partitioning an inside of the cylinder into two chambers, a piston rod having one end coupled with the piston and an opposite end extending out of the cylinder, an extension-side passage and a compression-side passage provided in the piston, a piston bolt inserted through an axial hole of the piston, an extension-side main valve provided in the extension-side passage, an extension-side backpressure chamber configured to adjust a valve-opening pressure of the extension-side main valve, a compression-side main valve provided in the compression-side passage, a compression-side backpressure chamber configured to adjust a valve-opening pressure of the compression-side main valve, a common passage configured to establish communication between the extension-side backpressure chamber and the compression-side backpressure chamber, a valve shaft movably provided in the common passage, a valve spring configured to bias the valve shaft in a valve-opening direction, a pilot valve configured to control a flow of oil fluid in the common passage, and an actuator configured to control the movement of the valve shaft. A first valve portion is provided at one axial end of a valve body of the valve shaft. The first valve portion is configured to restrict a flow of the hydraulic fluid between the first valve portion and a first valve seat formed on the piston bolt when no power is supplied to the actuator. A second valve portion is provided at an opposite axial end side of the valve body. The second valve portion is configured to restrict a flow of the hydraulic fluid between the second valve portion and a second valve seat formed on the piston bolt when power is supplied to live actuator. The piston bolt includes a first member and a second member. The first valve seat is formed in the first member. The second valve seat is formed in the second member.

Advantageous Effects of Invention

According to the one aspect of the present invention, the man-hours for the piston bolt can be reduced.

DESCRIPTION OF EMBODIMENTS (First Embodiment) A first embodiment of the present invention will be described with reference to the accompanying drawings.

Figure 1:
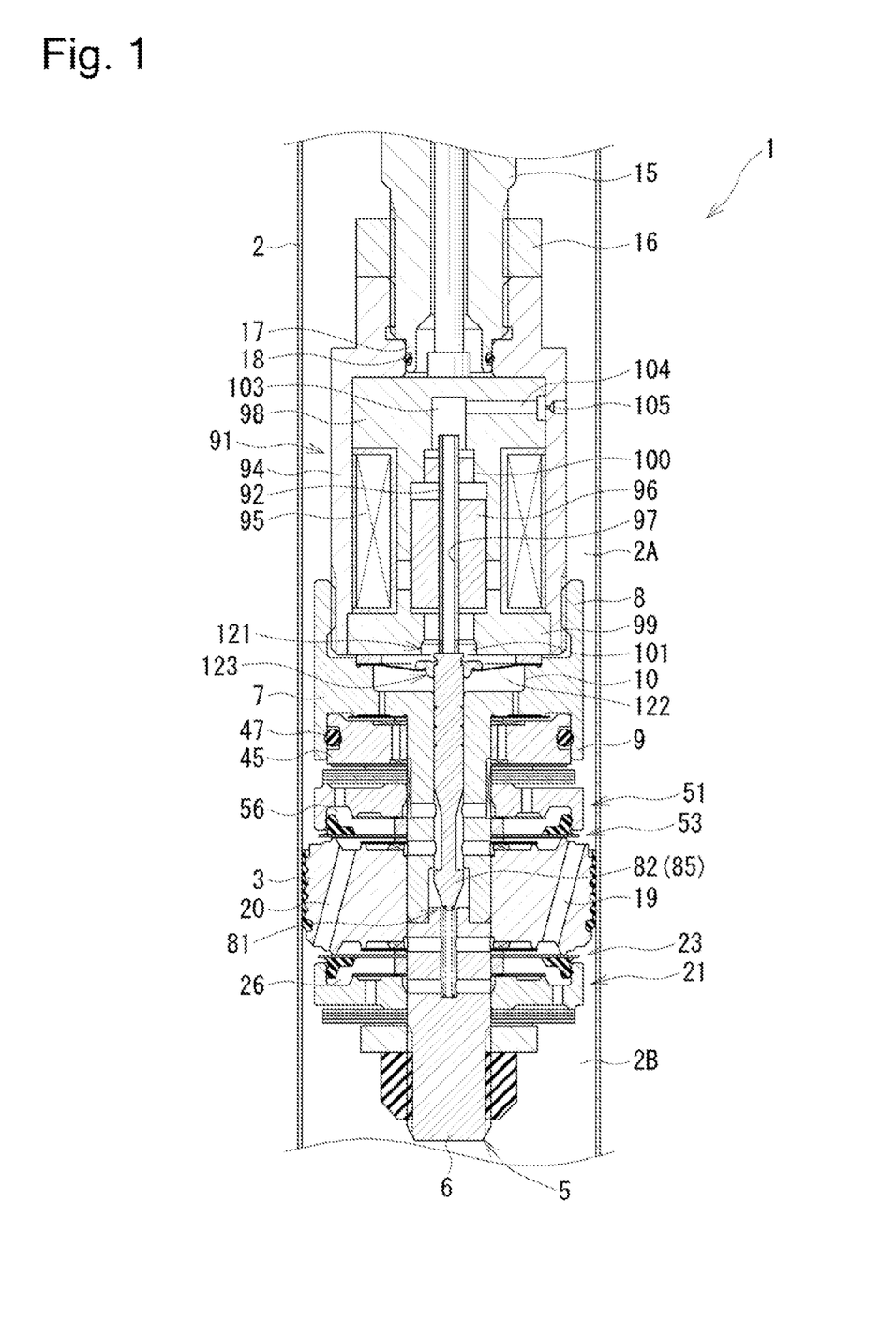
FIG. 1 is a cross-sectional view of main portions of a shock absorber according to a first embodiment.

For convenience, a "vertical direction" herein is defined to be the vertical direction in FIG. 1. The first embodiment is a single tube-type damping force adjustable shock absorber, but can also be applied to a twin tube-type damping force adjustable shock absorber including a reservoir.

As illustrated in FIG. 1, a piston 3 is slidably fitted in a cylinder 2. The piston 3 partitions the inside of the cylinder 2 into two chambers, a cylinder upper chamber 2A and a cylinder lower chamber 2B. A free piston (not illustrated) vertically movable in the cylinder 2 is provided in the cylinder 2, and the free piston partitions the inside of the cylinder 2 into the cylinder lower chamber 2B on the piston 3 side and a gas chamber (not illustrated) on the bottom side.

A shaft portion 6 of a piston bolt 5 is inserted through an axial hole 4 of the piston 3. The piston bolt 5 includes a head portion 7, and an upper-side first cylindrical portion 8 and a lower-side second cylindrical portion 9. The head portion 7 is provided at the upper end portion of the shaft portion 6. The first cylindrical portion 8 and the second cylindrical portion 9 are formed on the outer peripheral edge portions of the head portion 7. The lower end portion of a solenoid case 94 is connected to the first cylindrical portion 8 by screw coupling. A common passage 11 is provided in the shaft portion 6 of the piston bolt 5. The common passage 11 is disposed coaxially with the shaft portion 6 and extends axially (vertically).

Figure 2:
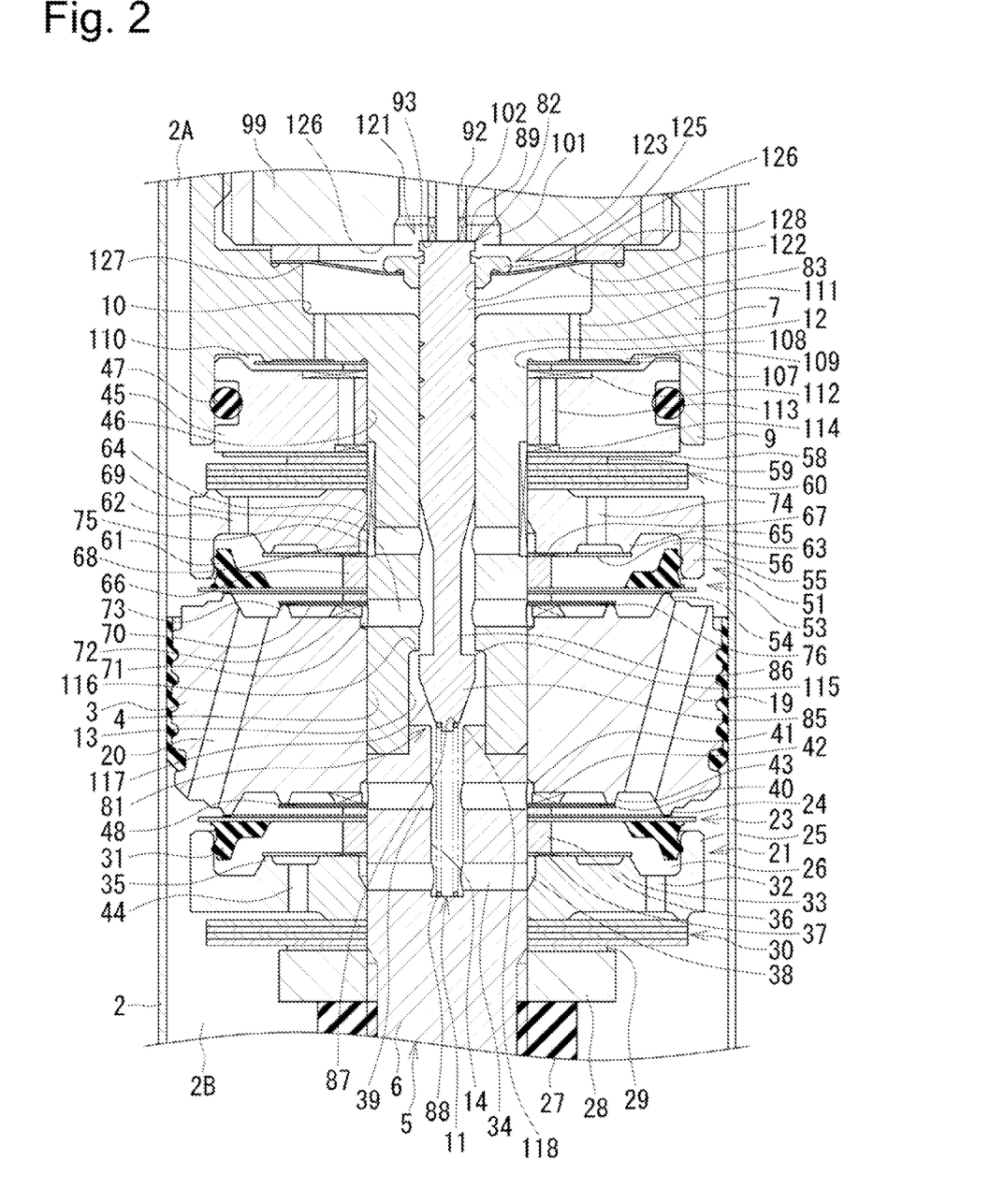
FIG. 2 is an enlarged view of a damping force adjustment mechanism in FIG. 1.

As illustrated in FIG. 2, the common passage 11 is formed by each of axial passages including a first small-diameter portion 12, a second small-diameter portion 14, and a large-diameter portion 13. The first small-diameter portion 12 is formed at the upper portion of the common passage 11, and is opened at the upper end thereof. The second small-diameter portion 14 is formed at the lower portion of the common passage 11, and is closed at the lower end thereof. The large-diameter portion 13 connects the first small-diameter portion 12 and the second small-diameter portion 14. In terms of the inner diameter of the common passage 11, the large-diameter portion 13 is the largest, followed by the first small-diameter portion 12 and the second small-diameter portion 14. The common passage 11 (the first small-diameter portion 12) is opened to the bottom surface of a recessed portion 10 formed on the head portion 7 of the piston bolt 5. The recessed portion 10 is formed into a circular shape coaxial with the piston bolt 5 in cross section taken along a plane perpendicular to the axis.

As illustrated in FIG. 1, the lower end portion (one end) of a piston rod 15 is connected to the upper end portion of the solenoid case 94 by screw coupling. The upper end side (the opposite end) of the piston rod 15 extends out of the cylinder 2. A nut 16 serving as a loose stopper is attached to the lower end portion of the piston rod 15. A small-diameter portion 17 is formed at the lower end of the piston rod 15. A seal member 18 is placed in an annular groove (not labeled) formed on the outer peripheral surface of the small-diameter portion 17. The seal member 18 seals between the solenoid case 94 and the piston rod 15.

An extension-side passage 19 and a compression-side passage 20 are provided in the piston 3. The upper end of the extension-side passage 19 is opened to the cylinder upper chamber 2A side. The lower end of the compression-side passage 20 is opened to the cylinder lower chamber 2B side. An extension-side valve mechanism 21 is provided at the lower end of the piston 3. The extension-side valve mechanism 21 controls a flow of oil fluid (hydraulic fluid) in the extension-side passage 19. A compression-side valve mechanism 51 is provided at the upper end of the piston 3. The compression-side valve mechanism 51 controls a flow of the oil fluid in the compression-side passage 20.

As illustrated in FIG. 2, the extension-side valve mechanism 21 includes an annular seat portion 24, an extension-side main valve 23, an extension-side pilot body 25, and an extension-side backpressure chamber 26. The seat portion 24 is formed on the outer peripheral side of the lower end surface of the piston 3. The extension-side main valve 23 is in abutment with the seat portion 24 separably therefrom. The extension-side pilot body 25 is attached to the shaft portion 6 of the piston bolt 5. The extension-side backpressure chamber 26 is formed between the extension-side pilot body 25 and the extension-side main valve 23. The pressure in the extension-side backpressure chamber 26 is applied to the extension-side main valve 23 in a valve-closing direction.

A nut 27 is attached to the lower end portion of the shaft portion 6 of the piston bolt 5. A washer 28, a retainer 29, and a disk valve 30 are provided between the nut 27 and the extension-side pilot body 25 in this order from the lower side. The washer 28, the retainer 29, and the disk valve 30 are held between the nut 27 and the inner peripheral edge portion of the extension-side pilot body 25. The extension-side main valve 23 is a packing valve in which an annular packing 31 made of an elastic member is in contact with the inner peripheral surface of the extension-side pilot body 25 along the entire circumference thereof.

The extension-side backpressure chamber 26 is in communication with the cylinder lower chamber 2B via a passage 32 formed in the extension-side pilot body 25 and the disk valve 30. When the pressure in the extension-side backpressure chamber 26 reaches a predetermined pressure, the disk valve 30 is opened and relieves the pressure in this extension-side backpressure chamber 26 into the cylinder lower chamber 2B. The extension-side backpressure chamber 26 is in communication with a radial passage 34 formed in the shaft portion 6 of the piston bolt 5 via a disk-like extension-side backpressure introduction valve 33. The radial passage 34 is in communication with the second small-diameter portion 14.

The extension-side backpressure introduction valve 33 is a check valve that permits a flow of the oil fluid from the cylinder lower chamber 2B to the extension-side backpressure chamber 26 via a passage 44 of the extension-side pilot body 25. The extension-side backpressure introduction valve 33 is seated on an annular seat portion 35, which is formed on the upper surface of the extension-side pilot body 25 (the surface on the extension-side backpressure chamber 26 side) on the inner peripheral side with respect to the passage 32 and the outer peripheral side with respect to the passage 44. The inner peripheral edge portion of the extension-side backpressure introduction valve 33 is held between the inner peripheral edge portion of the extension-side pilot body 25 and a spacer 36. The extension-side backpressure chamber 26 is in communication with the radial passage 34 via a plurality of extension-side introduction orifices 37 formed on the inner peripheral side of the extension-side backpressure introduction valve 33 and an annular passage 38 formed on the inner peripheral edge portion of the extension-side pilot body 25.

The second small-diameter portion 14 is in communication with a radial passage 39 (a compression-side discharge passage) formed in the shaft portion 6 of the piston bolt 5. The radial passage 39 is in communication with the extension-side passage 19 via an annular passage 41 formed at the lower end portion of the axial hole 4 of the piston 3, a plurality of cutouts 42 formed on the lower end side of the inner peripheral edge portion of the piston 3, and a compression-side check valve 40 provided on the piston 3. The compression-side check valve 40 is separably in abutment with an annular seal portion 43, which is provided on the lower end side of the piston 3 on the inner peripheral side with respect to the seat portion 24 and the extension-side passage 19. The compression-side check valve 40 permits a flow of the oil fluid from the radial passage 39 to the extension-side passage 19.

The compression-side valve mechanism 51 includes an annular seat portion 54, a compression-side main valve 53, a compression-side pilot body 55, and a compression-side backpressure chamber 56. The seat portion 54 is formed on the upper end surface of the piston 3 on the outer peripheral side. The compression-side main valve 53 is in abutment with the seat portion 54 separably therefrom. The compression-side pilot body 55 is attached to the shaft portion 6 of the piston bolt 5. The compression-side backpressure chamber 56 is formed between the compression-side pilot body 55 and the compression-side main valve 53. The pressure in the compression-side backpressure chamber 56 is applied to the compression-side main valve 53 in a valve-closing direction.

A washer 45 is fitted on the inner peripheral side of the second cylindrical portion 9 of the piston bolt 5. The shaft portion 6 of the piston boll 5 is inserted through an axial hole 46 of the washer 45. An annular seal member 47 provided around the outer periphery of the washer 45 seals between the washer 45 and the second cylindrical portion 9. A disk 58, a retainer 59, and a disk valve 60 are provided between the washer 45 and the compression-side pilot body 53 in this order from the upper side. The disk 58, the retainer 59, and the disk valve 60 are held between the washer 45 and the inner peripheral edge portion of the compression-side pilot body 55. The compression-side main valve 53 is a packing valve in which an annular packing 61 made of an elastic member is in contact with the inner peripheral surface of the compression-side pilot body 55 along the entire circumference thereof.

The compression-side backpressure chamber 56 is in communication with the cylinder upper chamber 2A via a passage 62 formed in the compression-side pilot body 55 and the disk valve 60. When the pressure in the compression-side backpressure chamber 56 reaches a predetermined pressure, the disk valve 60 is opened and relieves the pressure in this compression-side backpressure chamber 56 into the cylinder upper chamber 2A. The compression-side backpressure chamber 56 is in communication with a radial passage 64 formed in the shaft portion 6 of the piston bolt 5 via a disk-like compression-side backpressure introduction valve 63. The redial passage 64 is in communication with the first small-diameter portion 12.

The compression-side backpressure introduction valve 63 is a check valve that permits a floss of the oil fluid from the cylinder upper chamber 2A to the compression-side backpressure chamber 56 via a passage 74 of the compression-side pilot body 55. The compression-side backpressure introduction valve 63 is seated on an annular seat portion 65, which is formed on the lower surface of the compression-side pilot body 55 (the surface on the compression-side backpressure chamber 56 side) on the inner peripheral side with respect to the passage 62 and the outer peripheral side with respect to the passage 74. The inner peripheral edge portion of the compression-side backpressure introduction valve 63 is held between the inner peripheral edge portion of the compression-side pilot body 55 and a spacer 66. The compression-side backpressure chamber 56 is in communication with the radial passage 64 via a plurality of compression-side introduction orifices 67 formed on the inner peripheral side of the compression-side backpressure introduction valve 63, an annular passage 68 formed on the inner peripheral edge portion of the compression-side pilot body 55, and a width-across-flats portion 75 formed on the shaft portion 6 of the piston bolt 5.

The first small-diameter portion 12 is in communication with a radial passage 60 (a compression-side discharge passage) formed in the shaft portion 6 of the piston bolt 5. The radial passage 69 is in communication with the compression-side passage 20 via an annular passage 71 formed at the upper end portion of the axial hole 4 of the piston 3, a plurality of cutouts 72 formed on the upper end side of the inner peripheral edge portion of the piston 3, and an extension-side check valve 70 provided on the piston 3. The extension-side check valve 70 is separably in abutment with an annular seat portion 73, which is provided on the upper end side of the piston 3 on the inner peripheral side with respect to the seat portion 54 and the compression-side passage 20. The extension-side check valve 70 permits a flow of the oil fluid from the radial passage 69 to the compression-side passage 20.

A flow of the oil fluid in the common passage 11 of the piston bolt 5 is controlled by a pilot valve 81 (a pilot valve). The pilot valve 81 includes a valve spool 82 (a valve shaft) slidably fitted in the communication passage 11. The valve spool 82 includes a solid shaft, and forms the pilot valve 81 together with the piston bolt 5. The valve spool 82 includes a sliding portion 83, a valve body 85, and a connection portion 86. The sliding portion 83 is inserted in the upper side of the first small-diameter portion 12 with respect to the radial passage 64. The valve body 85 is separably in abutment with a second valve seat 118, which is formed on the circumferential edge of the opening of the second small-diameter portion 14. The connection portion 86 connects the sliding portion 83 and the valve body 85.

A valve spring 88, which is formed by a compression spring, is disposed between a spring bearing portion 87 formed on the valve body 85 of the valve spool 82 and the bottom portion of the common passage 11 (the second small-diameter portion 14). The valve spring 88 biases the valve spool 82 in a valve-opening direction (the "upward direction" in FIG. 2). As a result, an end surface 89 of the sliding portion 83 abuts against (is pressed against) a lower end surface 93 of an actuation rod 92 of a solenoid 91 (an actuator). The present embodiment indicates the configuration that puts the actuation rod 92 into operation by generating a thrust force by power supply to a coil 95, but, for example, a mechanism that switches the spring constant of a valve spring by an actuator or controls the hydraulic pressure may be employed as the method for putting the actuation rod 92 into operation.

As illustrated in FIG. 1, the solenoid 91 includes the solenoid case 94, the actuation rod 92, and the coil 95. A plunger 96 is coupled with the outer peripheral surface of the actuation rod 92. The plunger 96 generates a thrust force by power supply to the coil 95. A rod inner passage 97 is formed on the inner peripheral side of the actuation rod 92. The actuation rod 92 is guided vertically (axially) by a bush 100 provided in a core 98.

A spool backpressure chamber 101 is formed on the inner peripheral side of a core 99 of the solenoid 91. The spool backpressure chamber 101 is in communication with the cylinder upper chamber 2A via an upper chamber-side communication passage including a plurality of cutouts 102 provided at the lower end portion of the actuation rod 92, the rod inner passage 97, a rod backpressure chamber 103 formed in the core 98, a passage 104 radially extending in the core 98, and an air removal orifice 105 formed on the side wall of the solenoid case 94.

As illustrated in FIG. 2, a spool backpressure relief valve 107 (a check valve) and a spacer 108 are provided between the head portion 7 of the piston bolt 5 and the washer 45 in this order from the upper side. The inner peripheral edge portion of the spool back-pressure relief valve 107 is held by the spacer 108 and the inner peripheral edge portion of the head portion 7 of the piston bolt 5. On the other hand, the outer peripheral edge portion of the spool back-pressure relief valve 107 is separably in abutment with an annular seat portion 109, which is formed on the lower surface of the head portion 7 of the piston bolt 5. An annular passage 110 is formed between the bead portion 7 of the piston bolt 5 and the washer 45. The annular passage 110 serves as a space for opening the spool backpressure relief valve 107. The spool backpressure relief valve 107 is a check valve that permits a flow of the oil fluid from the spool backpressure chamber 101 to the annular passage 110.

The spool backpressure chamber 101 is in communication with the cylinder lower chamber 2B via a lower chamber-side communication passage including the recessed portion 10 of the piston bolt 5, a plurality of passages 111 formed in the head portion 7 of the piston bolt 5, the spool backpressure relief valve 107, the annular passage 110, a plurality of cutouts 112 formed on the inner peripheral edge portion of the upper end surface of the washer 45, a plurality of passages 113 formed in the washer 45, a plurality of cutouts 114 formed on the inner peripheral edge portion of the lower end surface of the washer 45, the width-across-flats portion 75 formed on the shaft portion 6 of the piston bolt 5, the annular passage 68 formed in the compression-side pilot body 55, the radial passage 64, the first small-diameter portion 12, the radial passage 69, the annular passage 71 and the cutouts 72 formed on the piston 3, the extension-side check valve 70, and the compression-side passage 20.

A fail-safe valve 121 is provided on the head portion 7 of the piston bolt 5. The fail-safe valve 121 includes a disk-like fail-safe spring 122 and a spring fixation member 123 fixed at the upper end portion of the valve spool 82. The spring fixation member 123 is coupled with the valve spool 82 by crimping the inner peripheral edge portion thereof on the upper end side along the entire circumference or partially. The outer peripheral edge portion of the fail-safe spring 122 is supported by a step portion 127 (the opening edge portion of the recessed portion 10) of the head portion 7 of the piston bolt 5. Further, the outer peripheral edge portion of the fail-safe spring 122 is held between the core 99 and the step portion 127 via a spacer 128.

Then, when no power is supplied to the coil 95, a spring bearing portion 125 of the spring fixation member 123 is seated on a seat portion 126 formed on the core 99 under the spring force of the fail-safe spring 122. As a result, the fail-safe valve 121 is closed, thereby blocking the communication between the upper chamber-side communication passage and the lower chamber-side communication passage. Further, the first valve portion 115 of the valve body 85 of the valve spool 82 is seated on a first valve seat 116 of the piston bolt 5. As a result, the communication between the extension-side backpressure chamber 26 and the compression-side backpressure chamber 56 is blocked.

On the other hand, when power is supplied to the coil 95, the second valve portion 117 of the valve body 85 of the valve spool 32 is seated on the second valve seat 118 of the piston bolt 5 under the thrust force of the actuation rod 92 (the plunger 96). As a result, the communication between the extension-side backpressure chamber 26 and the compression-side backpressure chamber 56 is blocked. Now, the valve-opening pressure of the pilot valve 81 (the valve body 85) is controlled by changing a current value of the power supplied to the coil 95. At the time of a soft mode in which the power supplied to the coil 95 has a low current value, the spring force of the valve spring 88 and the thrust force of the actuation rod 92 are balanced, and the valve body 85 is brought into a state of being separated from the second valve seat 118 (refer to FIG. 2).

Next, a pilot flow of the oil fluid according to the first embodiment will be described.

(Compression Stroke) Before the pilot valve 81 is opened, the oil fluid in the cylinder lower chamber 2B is introduced into the compression-side backpressure chamber 56 via the compression-side passage 20, an orifice 76 of the extension-side check valve 70, the cutouts 72 of the piston 3, the annular passage 71, the radial passage 69, the first small-diameter portion 12 (the common passage 11), and a compression-side introduction passage, i.e., the radial passage 64, the width-across-flats portion 75 of the shaft portion 6, the annular passage 68, and the compression-side introduction orifices 67 of the compression-side backpressure introduction valve 63. Further, the oil fluid introduced into the first small-diameter portion 12 flows into the cylinder upper chamber 2A via the compression-side introduction orifices 67 of the compression-side backpressure introduction valve 63, the annular passage 68, the width-across-flats portion 75 of the shaft portion 6, live cutouts 114 of the washer 45, and the disk 58.

When the pilot valve 81 is opened, the oil fluid introduced into the first small-diameter portion 12 is introduced into the compression-side backpressure chamber 56 via the compression-side introduction passage, and also flows into the cylinder upper chamber 2A via a compression-side pilot passage, i.e., the large-diameter portion 13 (the common passage 11), the second small-diameter portion 14 (the common passage 11), the radial passage 39, the annular passage 41, the cutouts 42 of the piston 3, the compression-side check valve 40, and the extension-side passage 19. At this time, live valve-opening pressure of the pilot valve 81 can be adjusted by controlling the current value of the power supplied to the coil 95 of the solenoid 91. At the same time, the valve-opening pressure of the compression-side main valve 53 can be controlled, because the pressure of the oil fluid introduced from the compression-side backpressure introduction valve 63 into the compression-side backpressure chamber 56 is also adjusted.

(Extension Stroke) Before the pilot valve 81 is opened, the oil fluid in the cylinder upper chamber 2A is introduced into the extension-side backpressure chamber 26 via the extension-side passage 19, an orifice 48 of the compression-side check valve 40, the cutouts 42 of the piston 3, the annular passage 41, the radial passage 39, the second small-diameter portion 14 (the common passage 11), and an extension-side introduction passage, i.e., the radial passage 34, the annular passage 38, and the extension-side introduction orifices 37 of the extension-side backpressure introduction valve 33. Further, the oil fluid in the cylinder upper chamber 2A flows into the cylinder lower chamber 2B via the above-described upper chamber-side communication passage and lower chamber-side communication passage.

When the pilot valve 81 is opened, the oil fluid introduced into the second small-diameter portion 14 is introduced into the extension-side backpressure chamber 26 via an extension-side introduction passage, and also flows into the cylinder lower chamber 2B via the extension-side pilot passage, i.e., the large-diameter portion 13 (the common passage 11), the first small-diameter portion 12 (the common passage 11), the radial passage 69, the annular passage 71, the cutouts 72 of the piston 3, the extension-side check valve 70, and the compression-side passage 20. At this time the valve-opening pressure of the pilot valve 81 can be adjusted by controlling the current value of the power supplied to the coil 95 of the solenoid 91. At the same time, the valve-opening pressure of the extension-side main valve 23 can be controlled, because the pressure of the oil fluid introduced from the extension-side backpressure introduction valve 33 into the extension-side backpressure chamber 26 is also adjusted.

Figure 3:
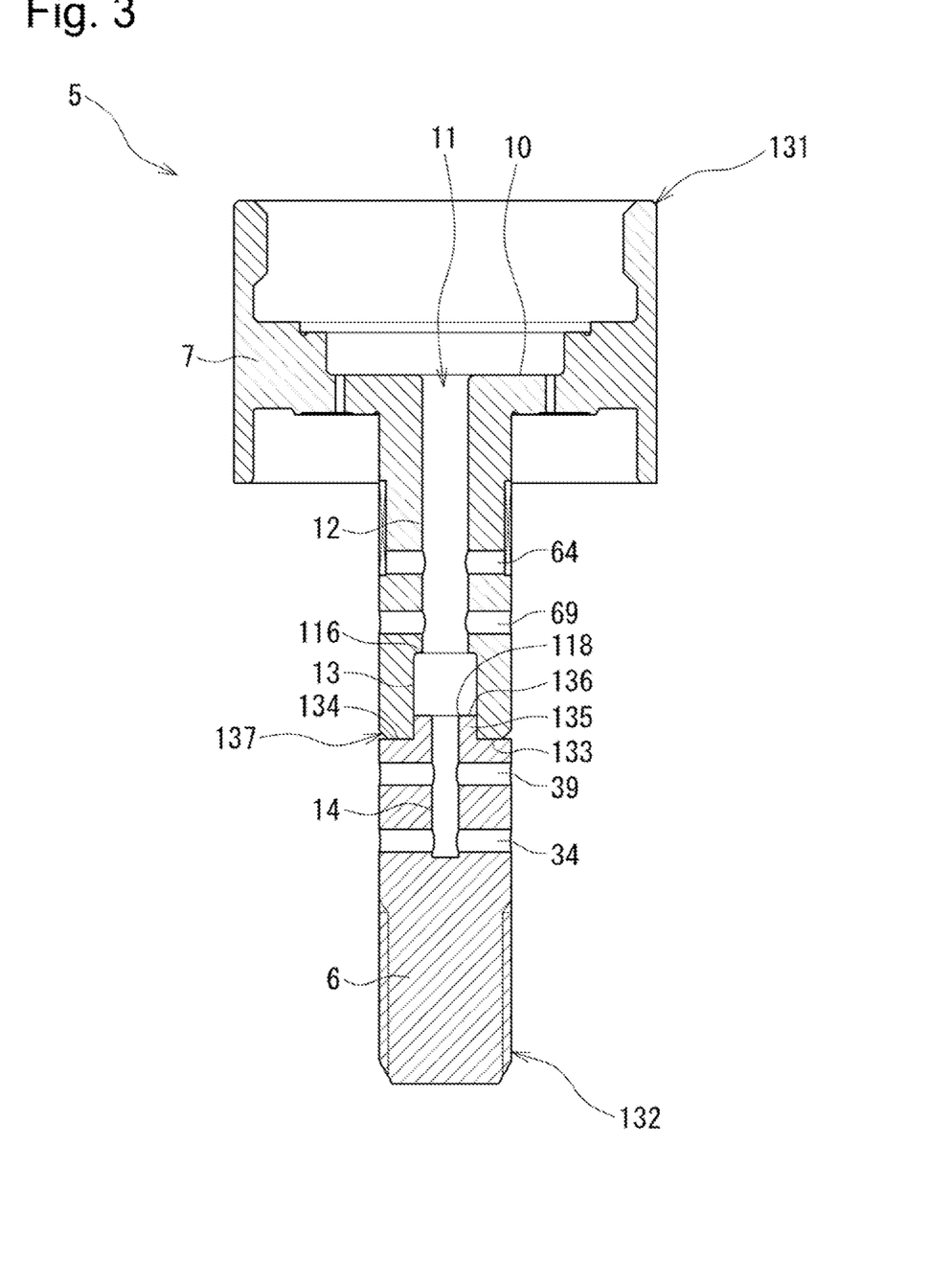
FIG. 3 illustrates the first embodiment, and is a cross-sectional view of a piston bolt taken along an axial plane.

Next, the piston bolt 5 according to the first embodiment will be described with reference to FIG. 3.

The piston bolt 5 includes a first member 131 and a second member 132. The first member 131 and the second member 132 are configured axially ("vertically" in FIG. 3) detachably at an intermediate position of the shaft portion 6. The first member 131 as one of them (the head portion 7 side) is provided with the first small-diameter portion 12 and the large-diameter portion 13 of the common passage 11. The second member 132 as the other of them (the distal end side of the shaft portion 6) is provided with the second small-diameter portion 14 of the common passage 11.

The large-diameter portion 13 of the common passage 11 is opened to a lower end surface 133 of the first member 131. In other words, the annular lower end surface 133, which extends perpendicularly to the axis (the central line) of the piston bolt 5, is formed at the lower end (the opposite axial end) of the large-diameter portion 13. The first valve seat 116 is formed on the first member 131. The first valve seat 116 is provided at the lower end (the opposite axial end) of the first small-diameter portion 12. Then, the first valve portion 115 provided at the upper end tone axial end) of the valve body 85 (refer to FIG. 1) is seated on the first valve seal 116 provided on the piston bolt 5, by which a flow of the oil fluid between the first small-diameter portion 12 and the second small-diameter portion 14 is blocked (restricted).

On the other hand, a columnar protrusion portion 135, which is coaxial with the piston bolt 5, is formed on the inner peripheral side of an upper end surface 134 (one axial end surface) of the second member 132. In other words, the annular upper end surface 134, which extends perpendicularly to the axis (the central line) of the piston bolt 5, is formed on the second member 132. The upper end (one axial end) of the second small-diameter portion 14 is opened to an end surface 136 of the protrusion portion 135. The second valve seat 118 is provided at the upper end (the one axial end) of the second small-diameter portion 14. Then, the second valve portion 117 provided at the tapering portion (the opposite axial end side) of the valve body 85 (refer to FIG. 1) is seated on the second valve seat 118 provided on the piston bolt 5, by which a flow of the oil fluid between the first small-diameter portion 12 and the second small-diameter portion 14 is blocked (restricted).

Then, to form the piston bolt 5 by joining the first member 131 and the second member 132, the protrusion portion 135 of the second member 132 is press-fitted (inserted) into the large-diameter portion 13 of the first member 131, and the annular lower end surface 133 (the opposite axial end surface) of the first member 131 and the annular upper end surface 134 (the one axial end surface) of the second member 132 are brought into abutment with each other (are butted against each other). As a result, the coaxiality of the common passage 11, i.e., the first small-diameter portion 12, the large-diameter portion 13, and the second small-diameter portion 14, and the perpendicularity between the first small-diameter portion 12 as a spool sliding surface on the first member 131 side and the end surface 136 of the protrusion portion 135 as a valve seat surface (the second valve seat 118) on the second member 132 side are ensured. The first member 131 and the second member 132 are joined at an abutment portion 137 therebetween by brazing using a brazing material such as copper. The joining method may be welding or gluing, besides brazing.

Now, the conventional piston bolt formed by one member is formed by inserting a tool (an instrument) from the head portion side in one direction to process the common passage, thereby necessitating a special method and tool to process the large-diameter portion, and thus making it difficult to ensure the precision. Further, such processing leads to an increase in the man-hours for the piston bolt, thereby impairing the productivity and serving as a cause for an increase in the manufacturing cost. Further, because the large-diameter portion is formed at an axially intermediate position of the common passage, an approach to the large-diameter portion is difficult, and man-hours are required for the inspection.

On the other hand, in the first embodiment, the piston bolt 5 is formed by the divided first member 131 and second member 132, and the first small-diameter portion 12 and the large-diameter portion 13 of the common passage 11 are formed in the first member 131 and the second small-diameter portion 14 of the common passage 11 is formed in the second member 131, which facilitates an approach to each of the axial passages (the first small-diameter portion 12, the large-diameter portion 13, and the second small-diameter portion 14) of the common passage 11 when the common passage 11 is processed. This allows the common passage 11 to be processed using a general-purpose method and tool, and contributes to reducing the man-hours for the piston bolt 5. As a result, the productivity of the piston bolt 5 can be improved, and the manufacturing cost of the shock absorber 1 can be reduced. Further, because of the easy approach to each of the axial passages, the man-hours required for the inspection can be reduced.

Further, in the first embodiment, applying near shape processing (molding) to the material of the first member 131 makes a reduction in the cutting processing possible, thereby making a reduction in the man-hours for the processing possible. First, in the first embodiment, since the first member 131 and the second member 132 are joined by press-fitting the protrusion portion 135 of the second member 132 into the large-diameter portion 13 of the first member 131 and bringing the upper end surface 134 (the one axial end surface) of the second member 132 into abutment with the lower end surface 133 (the opposite axial end surface) of the first member 131, the coaxiality of the common passage 11 and the perpendicularity between the first small-diameter portion 12 as the spool sliding surface and the end surface 136 of the protrusion portion 135 as the valve seat surface can be ensured.

Further, in the first embodiment, the abutment portion 137 between the first member 131 and the second member 132 is brazed with the lower end surface 133 (the opposite axial end surface) of the first member 131 and the upper end surface 134 (the one axial end surface) of the second member 132 in abutment with each other. The brazing less induces deformation due to heat, thereby reducing deformation due to heat and eliminating the necessity of cutting processing for the purpose of a shape correction after the brazing, and thus preventing an increase in the man-hours.

Figure 4:
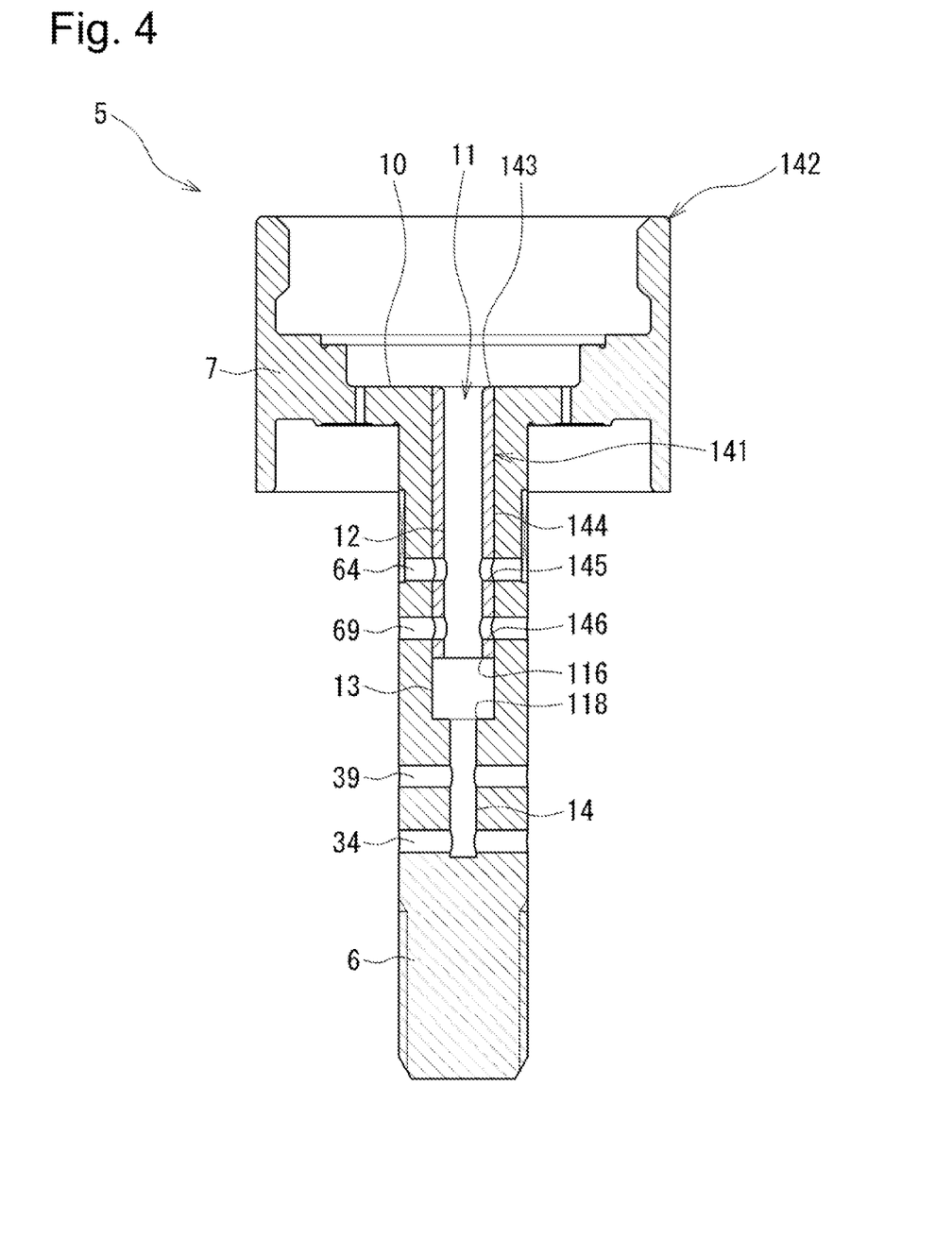
FIG. 4 illustrates a second embodiment, and is a cross-sectional view of a piston bolt taken along the axial plane.

(Second Embodiment) Next, a second embodiment will be described with reference to FIG. 4. The second embodiment will be described here, focusing on differences from the first embodiment. Features shared with the first embodiment will be identified by the same names and the same reference numerals.

In the first embodiment, the piston bolt 5 is formed by the divided first member 131 and second member 132, and the first small-diameter portion 12 and the large-diameter portion 13 of the common passage 11 are formed in the first member 131 and the second small-diameter portion 14 of the common passage 11 is formed in the second member 131.

On the other hand, in the second embodiment, the piston bolt 5 is formed by divided first and second members 141 and 142, and the first small-diameter portion 12 of the common passage 11 is formed in the first member 141 and the large-diameter portion 13 and the second small-diameter portion 14 of the common passage 11 are formed in the second member 142. The first member 141 is formed by a cylindrical sleeve-type component, and the first small-diameter portion 12 of the common passage 11 is formed on the inner periphery thereof. On the other hand, the upper end (one axial end) of the large-diameter portion 13 is opened to the recessed portion 10 of the second member 142.

A passage 145 and a passage 146 are provided in the first member 141. The passage 145 and the passage 146 establish communication with the radial passage 64 and the radial passage 69 formed in the second member 142, respectively. Further, the axial length of the first member 141 is set to a shorter length than the axial length of the large-diameter portion 13 formed in the second member 142. Then, the axial length of the large-diameter portion 13 in the piston bolt 5 matches a difference between the axial length of the large-diameter portion 13 in the second member 142 and the axial length of the first member 141.

Then, to form the piston bolt 5 by joining the first member 141 and the second member 142, the first member 141 is inserted from the upper end (the one end) of the large-diameter portion 13 of the second member 142, and the first member 141 is press-fitted into the large-diameter portion 13 of the second member 142 until the upper end surface 143 of the first member 141 become coplanar with the bottom surface of the recessed portion 10 of the second member 142. As a result, the large-diameter portion 13 containing the valve body 85 of the valve spool 82 (the valve shaft) is formed between the first small-diameter portion 12 and the second small-diameter portion 14 of the piston bolt 5.

The piston bolt 5 may be configured to ensure the sealing performance due to the press-fitting on a faying surface 144 between the first member 141 and the second member 142 by joining, gluing, or the like.

According to the second embodiment, similar functions and advantageous effects to the above-described first embodiment can be achieved.

Figure 5:
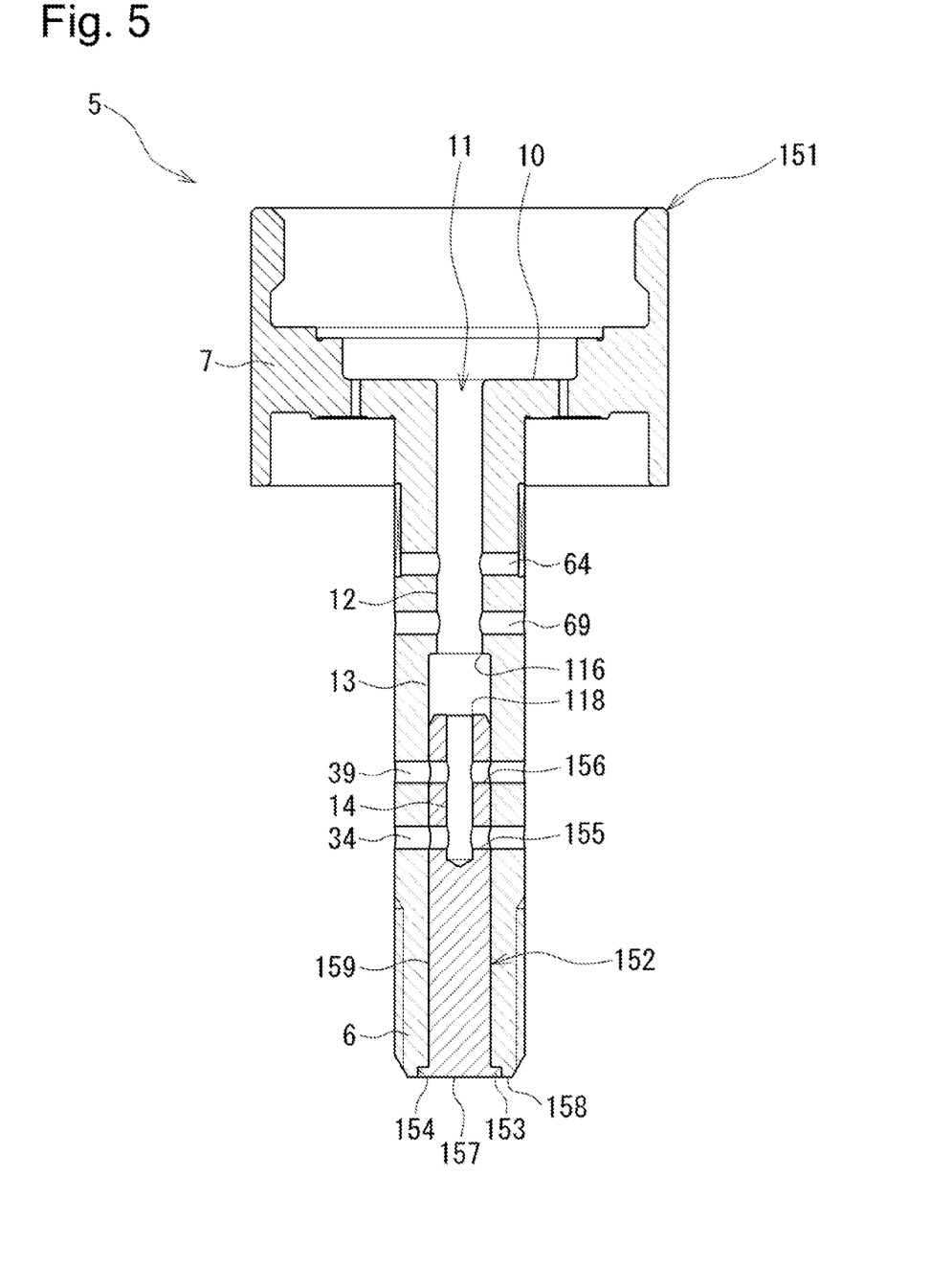
FIG. 5 illustrates a third embodiment, and is a cross-sectional view of a piston bolt taken along the axial plane.

(Third Embodiment) Next, a third embodiment will be described with reference to FIG. 5. The third embodiment will be described here, focusing on differences from the first and second embodiments. Features shared with the first and second embodiments will be identified by the same names and the same reference numerals.

In the third embodiment, the piston bolt 5 is formed by divided first and second members 151 and 152, and the first small-diameter portion 12 and the large-diameter portion 13 of the common passage 11 are formed in the first member 151 and the second small-diameter portion 14 of the common passage 11 is formed in the second member 152. The third embodiment is identical to the first embodiment in terms thereof.

The second member 152 has a shaft shape, and a flange 153 is formed at the opposite axial end. One end of the second small-diameter portion 14 of the common passage 11 is opened to one axial end of the second member 152. On the other hand, the opposite end of the large-diameter portion 13 of the common passage 11 is opened to the opposite axial end of the first member 151. Spot facing 154, to which the flange 153 of the second member 152 is fitted, is formed on the circumferential edge of the opening of the large-diameter portion 13 at the opposite axial end of the first member 152.

A passage 155 and a passage 156 are provided in the second member 152. The passage 155 and the passage 156 establish communication with the radial passage 34 and the radial passage 39 formed in the first member 151, respectively. Further, the axial length of the second member 152 is set to a shorter length than the axial length of the large-diameter portion 13 formed in the first member 151. Then, the axial length of the large-diameter portion 13 in the piston bolt 5 matches a difference between the axial length of the large-diameter portion 13 in the first member 151 and the axial length of the second member 152.

Then, to form the piston bolt 5 by joining the first member 151 and the second member 152, the second member 152 is inserted from the lower end (the opposite end) of the large-diameter portion 13 of the first member 151, and the second member 152 is press-fitted into the large-diameter portion 13 of the first member 151 until the flange 153 of the second member 152 is fitted to the spot facing 154 of the first member 151 and the lower end surface 157 of the second member 152 becomes coplanar with the lower end surface 158 of the first member 151. As a result, the large-diameter portion 13 containing the valve body 85 of the valve spool 82 (the valve shaft) is formed between the find small-diameter portion 12 and the second small-diameter portion 14 of the piston bolt 5.

The piston bolt 5 may be configured to ensure the sealing performance due to the press-fitting on a faying surface 159 between the first member 151 and the second member 152 by joining, gluing, or the like.

According to the third embodiment similar functions and advantageous effects to the above-described first and second embodiments can be achieved.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiments can also be implemented with a configuration of another embodiment added to the configuration of this embodiment. Further, each embodiment can also be implemented with another configuration added, deleted, or replaced with respect to a part of the configuration of this embodiment.

The present application claim priority under the Paris Convention to Japanese Patent Application No. 2020-010063 filed on Jan. 24, 2020. The entire disclosure of Japanese Patent Application No. 2020-010063 on Jan. 24, 2020 including the specification, the claims, the drawings, and the abstract is incorporated herein by reference in its entirety.

| | REFERENCE SIGNS LIST |
|---|---|
| 1 | shock absorber |
| 2 | cylinder |
| 2A | cylinder upper chamber |
| 2B | cylinder lower chamber |
| 3 | piston |
| 5 | piston bolt |
| 11 | common passage |
| 15 | piston rod |
| 19 | extension-side passage |
| 20 | compression-side passage |
| 23 | extension-side main valve |
| 26 | extension-side backpressure chamber |
| 53 | compression-side main valve |
| 56 | compression-side backpressure chamber |
| 81 | pilot valve (pilot valve) |
| 82 | valve spool (valve shaft) |
| 85 | valve body |
| 88 | valve spring |
| 91 | solenoid (actuator) |
| 115 | first valve portion |
| 116 | first valve seat |
| 117 | second valve portion |
| 118 | second valve seat |

The invention claimed is:

1. A damping force adjustable shock absorber comprising:
a cylinder sealingly containing hydraulic fluid therein;
a piston slidably fitted in the cylinder and partitioning an inside of the cylinder into two chambers;
a piston rod having one end coupled with the piston and an opposite end extending out of the cylinder;
an extension-side passage and a compression-side passage provided in the piston;
a piston bolt inserted through an axial hole of the piston;
an extension-side main valve provided in the extension-side passage;

an extension-side backpressure chamber configured to adjust a valve-opening pressure of the extension-side main valve;
a compression-side main valve provided in the compression-side passage;
a compression-side backpressure chamber configured to adjust a valve-opening pressure of the compression-side main valve;
a common passage configured to establish communication between the extension-side backpressure chamber and the compression-side backpressure chamber;
a valve shaft movably provided in the common passage;
a spring fixation member fixed to the valve shaft;
a pilot valve configured to control a flow of hydraulic fluid in the common passage and provided at the distal end side of the valve shaft, the pilot valve including a valve body;
a valve spring configured to bias the pilot valve of the valve shaft in a valve-opening direction and to bias the spring fixation member fixed to the valve shaft, and
an actuator configured to control the movement of the valve shaft,
wherein a first valve portion is provided at one axial end of a valve body of the valve shaft, the first valve portion being configured to restrict a flow of the hydraulic fluid between the first valve portion and a first valve seat formed on the piston bolt when no power is supplied to the actuator,
wherein a second valve portion is provided at an opposite axial end side of the valve body, the second valve portion being configured to restrict a flow of the hydraulic fluid between the second valve portion and a second valve seat formed on the piston bolt when power is supplied to the actuator,
wherein the piston bolt includes a first member and a second member,
wherein the first valve seat is formed on the first member, and
wherein the second valve seat is formed on the second member.

2. The shock absorber according to claim 1, wherein a large-diameter portion containing the valve body therein, a first small-diameter portion opened to one axial side of the large-diameter portion, and a second small-diameter portion opened to an opposite axial side of the large-diameter portion are provided to the common passage,
wherein the first small-diameter portion and the large-diameter portion are provided in any one of the first member and the second member, and
wherein the second small-diameter portion is provided in the other of the first member and the second member.

3. The shock absorber according to claim 2, wherein the first small-diameter portion and the large-diameter portion are formed at one axial end and an opposite axial end of the first member, respectively, and
wherein one end of the second member is fixed by being inserted in the large-diameter portion.

4. The shock absorber according to claim 1, wherein one axial end of the second member is the second valve seat.

5. The shock absorber according to claim 2, wherein a protrusion portion is formed on an inner peripheral side of one axial end surface of the second member, and
wherein the protrusion portion is fixed by being inserted in the large-diameter portion.

6. The shock absorber according to claim 5, wherein the one axial end surface of the second member and an opposite axial end surface of the first member are in abutment with each other.

7. The shock absorber according to claim 2, wherein a flange in abutment with the large-diameter portion of the first member is formed on an opposite axial end of the second member.

8. The shock absorber according to claim 2, wherein the first small-diameter portion is formed in the first member,
wherein the large-diameter portion and the second small-diameter portion are formed in the second member, and
wherein the first member is a hollow rod inserted in the large-diameter portion of the second member.

9. A damping force adjustable shock absorber comprising:
a cylinder sealingly containing hydraulic fluid therein;
a piston slidably fitted in the cylinder and partitioning an inside of the cylinder into two chambers;
a piston rod having one end coupled with the piston and an opposite end extending out of the cylinder;
an extension-side passage and a compression-side passage provided in the piston;
a piston bolt inserted through an axial hole of the piston;
an extension-side main valve provided in the extension-side passage;
an extension-side backpressure chamber configured to adjust a valve-opening pressure of the extension-side main valve;
a compression-side main valve provided in the compression-side passage;
a compression-side backpressure chamber configured to adjust a valve-opening pressure of the compression-side main valve;
a common passage configured to establish communication between the extension-side backpressure chamber and the compression-side backpressure chamber;
a valve shaft movably provided in the common passage;
a valve spring configured to bias the valve shaft in a valve-opening direction;
a pilot valve configured to control a flow of hydraulic fluid in the common passage; and
an actuator configured to control the movement of the valve shaft,
wherein a first valve portion is provided at one axial end of a valve body of the valve shaft, the first valve portion being configured to restrict a flow of the hydraulic fluid between the first valve portion and a first valve seat formed on the piston bolt when no power is supplied to the actuator,
wherein a second valve portion is provided at an opposite axial end side of the valve body, the second valve portion being configured to restrict a flow of the hydraulic fluid between the second valve portion and a second valve seat formed on the piston bolt when power is supplied to the actuator,
wherein the piston bolt includes a first member and a second member,
wherein the first valve seat is formed on the first member,
wherein the second valve seat is formed on the second member,
wherein a large-diameter portion containing the valve body therein, a first small-diameter portion opened to one axial side of the large-diameter portion, and a second small-diameter portion opened to an opposite axial side of the large-diameter portion are provided to the common passage, wherein the first small-diameter portion and the large-diameter portion are provided in any one of the first member and the second member, and wherein the second small-diameter portion is provided in the other of the first member and the second member.

10. The shock absorber according to claim 9, wherein the first small-diameter portion and the large-diameter portion are formed at one axial end and an opposite axial end of the first member, respectively, and wherein one end of the second member is fixed by being inserted in the large-diameter portion.

11. The shock absorber according to claim 9, wherein one axial end of the second member is the second valve seat.

12. The shock absorber according to claim 9, wherein a protrusion portion is formed on an inner peripheral side of one axial end surface of the second member, and wherein the protrusion portion is fixed by being inserted in the large-diameter portion.

13. The shock absorber according to claim 12, wherein the one axial end surface of the second member and an opposite axial end surface of the first member are in abutment with each other.

14. The shock absorber according to claim 9, wherein a flange in abutment with the large-diameter portion of the first member is formed on an opposite axial end of the second member.

15. The shock absorber according to claim 9, wherein the first small-diameter portion is formed in the first member, wherein the large-diameter portion and the second small-diameter portion are formed in the second member, and wherein the first member is a hollow rod inserted in the large-diameter portion of the second member.

\* \* \* \* \*